United States Patent
Meoni (10) Patent No.: US 11,198,162 B2
(45) Date of Patent: Dec. 14, 2021

(54) ASSEMBLY FOR FEEDING/PICKING UP CONTAINERS FOR WASHING MACHINES AND WASHING MACHINE

(71) Applicant: I.M.A. INDUSTRIA MACCHINE AUTOMATICHE S.P.A IN SIGLA IMA S.P.A., Ozzano Dell'Emilia (IT)

(72) Inventor: Eddi Meoni, Ozzano Dell'Emilia (IT)

(73) Assignee: I.M.A. INDUSTRIA MACCHINE AUTOMATICHE S.P.A IN SIGLA IMA S.P.A., Ozzano Dell'Emilia (IT)

( * ) Notice: Subject to any disclaimer, the term of this patent is extended or adjusted under 35 U.S.C. 154(b) by 99 days.

(21) Appl. No.: 16/085,738

(22) PCT Filed: Mar. 16, 2017

(86) PCT No.: PCT/IB2017/051540
§ 371 (c)(1),
(2) Date: Sep. 17, 2018

(87) PCT Pub. No.: WO2017/158553
PCT Pub. Date: Sep. 21, 2017

(65) Prior Publication Data
US 2019/0084017 A1    Mar. 21, 2019

(30) Foreign Application Priority Data
Mar. 17, 2016   (IT) .................. 102016000027869

(51) Int. Cl.
*B08B 9/42*     (2006.01)
*B08B 9/44*     (2006.01)
*B65G 47/90*    (2006.01)

(52) U.S. Cl.
CPC ............... *B08B 9/426* (2013.01); *B08B 9/44* (2013.01); *B65G 47/901* (2013.01)

(58) Field of Classification Search
CPC .. B65G 47/842; B65G 47/901; B65G 47/907; B65G 47/912; B08B 9/205; B08B 9/426;
(Continued)

(56) References Cited

U.S. PATENT DOCUMENTS 3,174,791 A * 3/1965 Dardaine ................ B65B 21/18
                                              294/87.24
3,545,804 A * 12/1970 Richner ................... B21J 13/08
                                              294/116

(Continued)

FOREIGN PATENT DOCUMENTS

CN        201189520 Y      2/2009
CN        102036890 A      4/2011

(Continued)

OTHER PUBLICATIONS

International Search Report dated Jul. 7, 2017 re: Application No. PCT/IB2017/051540, pp. 1-4, citing: WO 2008/007414 A1, EP 2 248 759 A1, EP 2 202 183 A1, US 2004/245791 A1 and DE 36 05 640 A1.

(Continued)

*Primary Examiner* — Marc Lorenzi
(74) *Attorney, Agent, or Firm* — Cantor Colburn LLP (57) ABSTRACT

An assembly for feeding/picking up containers for washing machines includes an external feeding station provided with a delivery area, an internal washing station, and an external output stations. The assembly further includes at least one support which can move by the action of respective actuators between at least one first configuration of alignment with a respective external station and at least one second configuration of alignment with the internal washing station. The support is provided with a plurality of grip clamps, each (Continued)

clamp is constituted by a pair of mutually opposite jaws, the internal faces of which are substantially concave and contoured.

6 Claims, 6 Drawing Sheets

(58) Field of Classification Search
CPC .. B08B 9/42; B08B 9/44; B23Q 7/048; B65H 5/14; H01L 21/68707; B25J 15/0052; B65B 21/18; B65B 21/183; B29C 49/4205
USPC ........ 414/226.01, 226.02, 751.1, 763, 792.9; 198/468.2, 803.7, 842
See application file for complete search history.

(56) References Cited

U.S. PATENT DOCUMENTS

| | | | |
|---|---|---|---|
| 4,709,803 A * | 12/1987 | Swiderski | B29C 49/4205 198/468.2 |
| 6,589,008 B1 * | 7/2003 | Ingraham | B65G 47/907 198/468.3 |
| 8,191,948 B2 * | 6/2012 | Preti | B67C 3/242 294/116 |
| 2004/0245791 A1 | 12/2004 | Tye | |
| 2010/0282574 A1 | 11/2010 | Ueda | |

FOREIGN PATENT DOCUMENTS

| | | | | |
|---|---|---|---|---|
| CN | 103922263 A | | 7/2014 | |
| CN | 104998872 A | | 10/2015 | |
| DE | 3605640 A1 | | 8/1987 | |
| EP | 2202183 A1 | | 6/2010 | |
| EP | 2248759 A1 | | 11/2010 | |
| GB | 2203404 A | * | 10/1988 | ........... B65G 47/907 |
| JP | S50117587 A | | 9/1975 | |
| JP | S52152068 A | | 12/1977 | |
| JP | S5662331 U | | 5/1981 | |
| JP | S58169984 U | | 11/1983 | |
| JP | H0245317 A | | 2/1990 | |
| JP | H0390684 U | | 9/1991 | |
| JP | H0680245 A | | 3/1994 | |
| JP | H07503667 A | | 4/1995 | |
| WO | 2008007414 A1 | | 1/2008 | |

OTHER PUBLICATIONS

IT Search Report dated Nov. 11, 2016 re: Application No. IT UA20161750, pp. 1-7 citing: WO 2008/007414 A1, EP 2 248 759 A1, EP 2 202 183 A1, US 2004/245791 A1 and DE 36 05 640 A1.
Written Opinion dated Jul. 7, 2017 re: Application No. PCT/IB2017/051540, pp. 1-4, citing: WO 2008/007414 A1, EP 2 248 759 A1 and EP 2 202 183 A1.
JP Office Action dated Feb. 2, 2021 re: Application No. 2018-544067, pp. 1-4, citing: JPH03-090684U, JPH07-503667A, JPS50-117587A, JPH06-080245A, JPS56-062331U, JPS58-169984U, JPS52-152068A, US2010/0282574A1 , JPH02-045317A.

* cited by examiner

ASSEMBLY FOR FEEDING/PICKING UP CONTAINERS FOR WASHING MACHINES AND WASHING MACHINE

TECHNICAL FIELD

The present disclosure relates to an assembly for feeding/picking up containers for washing machines, and a washing machine provided with such assembly.

BACKGROUND

Washing machines are designed to subject the containers that are to be processed to washing operations (generally executed with water, although the adoption is not ruled out of another solvent) in order to eliminate particles and residues that may be on their surfaces.

The washing fluid (water or other solvent in the liquid state or in the vapor state) therefore strikes the surfaces of the container, removing the particles by chemical action (the solvent detaches the particles which form a solution therein) and mechanical action (the jet of solvent carries out a mechanical ablation of the particles which form a suspension in it).

The containers that will undergo a washing treatment inside the assembly according to the disclosure will preferably be bottles, test tubes, phials, syringes, carpules, jars and the like. The possibility however is not ruled out of using the assembly according to the disclosure for feeding/picking up containers of another kind.

The use is known of washing machines in which the containers are fed, by a conveyor, to an accumulation area, in which the containers are placed in contact with each other. The entry station of the machine thus receives the containers thus accumulated, by picking them up in predefined groupings and subjecting each grouping of products to a washing process.

Subsequently the products are dispensed into an exit area where they are again accumulated in contact with each other.

The method of picking up the individual containers from the accumulation area distinguishes the two types of machines that are currently in use.

In each type, in any case, during the washing operations, the containers never come into contact with each other in order to prevent surface abrasion phenomena.

Mutual contact between the containers (which often can be made of glass or equally delicate materials) can in fact cause surface abrasions thereof.

Surface abrasion is seen, in many sectors (in particular in the pharmaceutical sector, in the cosmetic sector and so on), as a defect that compromises the characteristics of the container proper, and therefore it is not acceptable.

In a first type of machines, the products are conveyed inside respective receptacles (each product will be accommodated in a specific receptacle) in which they will be subjected to the washing operations. The containers are therefore subjected to washing operations in ordered rows of receptacles that advance in a linear fashion along the washing area.

Such receptacles must necessarily be shaped complementarily to the shape and dimensions of the containers that they will process (or at least of a family of containers) and this reduces the versatility of use of this type of washing machine.

At the same time, the insertion and pickup operations can subject the receptacles to external agents and therefore contaminate them, thus rendering the washing operations less safe.

Washing machines are also known in which the containers are picked up from the accumulation area in preset and ordered ranks.

In this second type of machines, the containers are taken individually from such ranks and delivered to respective grip means, which, again individually, conduct them through a washing process, at the end of which they are delivered to an exit area where they proceed toward the subsequent packaging stations. Generally, the picking up of the containers by each respective group is carried out by way of a rotary carousel.

The advantage of this second type lies in the absence of receptacles, with consequent greater versatility of use.

Furthermore such solution ensures that the grip means, which hold the containers during the washing operations, face outward for a minimal part of their travel, thus minimizing the risk of contamination by agents present in the outside environment (such as dust and the like).

SUMMARY

The principal aim of the present disclosure is to solve the above mentioned drawbacks, by providing an assembly for feeding/picking up containers for washing machines that ensures a high hourly rate of containers subjected to washing, while preventing contact between them during the washing proper.

Within this aim, the disclosure provides an assembly for feeding/picking up containers for washing machines that is particularly versatile and can be used with containers of various shape and various dimensions.

The disclosure also provides a washing machine that is provided with such versatile assembly and is therefore adapted to wash containers of different shape and different dimensions.

The disclosure further provides a washing machine provided with such assembly that can ensure a high hourly rate of products subjected to washing.

The present disclosure also provides an assembly for feeding/picking up containers for washing machines and a washing machine provided with such assembly which are low cost, easily and practically implemented and safely applied.

This aim and these and other advantages which will become better apparent hereinafter, are achieved by providing an assembly for feeding/picking up containers for washing machines comprising an external feeding station provided with a delivery area, an internal washing station, and an external output station, which is characterized in that it comprises at least one support which can move by the action of respective actuators between at least one first configuration of alignment with a respective external station and at least one second configuration of alignment with said internal washing station, and which is provided with a plurality of grip clamps, each clamp being constituted by a pair of mutually opposite jaws the internal faces of which are substantially concave and contoured.

Such aim and such advantages are also achieved by providing a washing machine for containers of the type comprising an external feeding station provided with a delivery area, an internal washing station, and an external output station, characterized in that it comprises an assembly for feeding/picking up containers that comprises at least one support which can move by the action of respective actuators between at least one first configuration of alignment with a respective external station and at least one second configuration of alignment with said internal washing station, and which is provided with a plurality of grip clamps, each clamp being constituted by a pair of mutually opposite jaws the internal faces of which are substantially concave and contoured.

BRIEF DESCRIPTION OF THE DRAWINGS

Further characteristics and advantages of the disclosure will become better apparent from the detailed description that follows of a preferred, but not exclusive, embodiment of the assembly for feeding/picking up containers for washing machines according to the disclosure, which is illustrated by way of non-limiting example in the accompanying drawings, in which.

DETAILED DESCRIPTION OF THE DRAWINGS

With reference to the figures, the reference numeral 1 generally designates an assembly for feeding/picking up containers A, B for washing machines.

The assembly 1 according to the disclosure is adapted to be installed on washing machines that comprise an external feeding station provided with a delivery area, an internal washing station, and an external output station.

The assembly 1 according to the disclosure comprises at least one support 2, which can move by the action of respective actuators between at least one first configuration of alignment with a respective external station (such external station can be the external feeding station, if the assembly 1 is used only to supply the containers A, B to the washing station, or the external output station, if the assembly 1 is used only for the exit of the containers A, B from the washing station; the possibility is not ruled out that the assembly 1 can carry out both movements, as will be better explained below), and at least one second configuration of alignment with the internal washing station.

The support 2 is provided with a plurality of grip clamps 3.

Each clamp 3 is constituted by a pair of mutually opposite jaws 4 and 5, the internal faces of which are substantially concave and contoured.

The support 2, by being able to move along the stations of the machine with which it is associated, makes it possible to transport the containers A, B along that machine and subject them to the washing operations.

If we consider the possibility of having a plurality of mutually interconnected supports 2 on a conveyance line on a same washing machine, it is evident that it will be possible to execute a precise washing of each container A, B while this follows a substantially linear motion along the machine without ever coming into contact with other containers A, B.

It follows from this that an implementation architecture of the type defined with the present disclosure makes it possible to have all the advantages of linear washing machines (long washing times) plus the advantages of washing machines provided with rotary carousels as well, i.e. individual treatment of each container A, B (preventing contact between them and therefore their wear) and universality of grip.

It is clear that the ability to have clamps 3 that are capable of holding containers A, B of different shapes and dimensions, without having to carry out any operation to change format, is extremely convenient and advantageous, ensuring a high versatility of the assembly 1 according to the disclosure. In addition it should be noted that during all the washing operations the containers A, B will always be kept mutually separated, thus preventing any risk of malfunction or damage (owing to wear, scratches and the like).

It is moreover useful to note that each support 2 preferably can be moved, by the action of respective actuators, between a first configuration of alignment with the external feeding station (in which the containers A, B are picked up by the clamps 3 from a delivery area), a second configuration of alignment with (and passing through) the internal washing station (in which the containers A, B undergo the washing proper) and a third configuration of alignment with the external output station (in which the containers A, B are delivered by the clamps 3 to an exit).

According to a particular embodiment of undoubted practical and applicative interest, the actuators can positively comprise an apparatus for the linear translation of the support 2 from the external feeding station to the external output station, passing through the internal washing station.

Similarly such actuators will also comprise at least one element for linear movement along a direction that is substantially transverse with respect to the direction defined by the aforementioned apparatus, in order to vary the height of the support 2 as a function of the detectable height between the area for the delivery of the containers A, B of the external feeding station, the washing area of the internal washing station, and the delivery area of the external output station.

In essence, it can be envisaged the supports 2 can be moved along a specific conveyance line arranged between the feeding station and the output station (passing through the washing station): such line therefore will have two motion components, one, substantially horizontal, along the direction defined by the entry and exit flow of the containers A, B with respect to the washing machine, and one, substantially vertical, which will allow movement toward/away from the containers A, B which, at each specific station, may be at different heights.

In order to define the key structural characteristics of the assembly 1 according to the disclosure, it should be noted that preferably interposed between the jaws 4 and 5 of each clamp 3 is an elastic element 6 for forcing into mutual abutment the internal faces of those jaws 4 and 5.

The clamps 3 will therefore usually be closed (clamped shut) by the action of the elastic element 6, and will open only upon an external command.

More specifically, it is shown that each internal face of the jaws 4 and 5 can effectively comprise a contoured concavity 7 provided with at least one substantially central recess 8, which is defined between concurrent planes 9 and 10.

The contoured concavity 7 will further comprise at least one protruding end tab 11.

Figure 4:
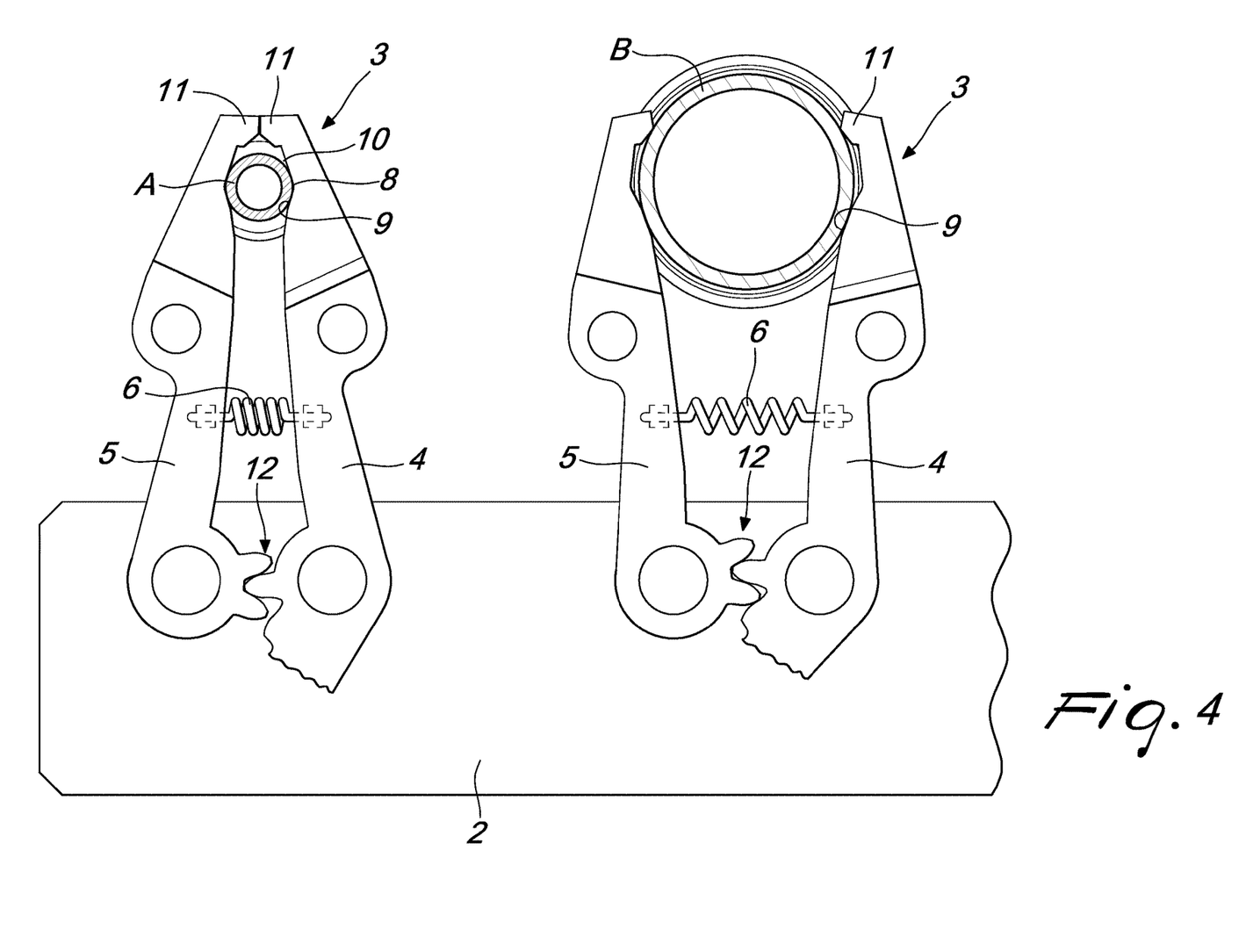
FIG. 4 is an enlarged view of a detail of FIG. 3.

When clamped in a respective clamp 3, the containers A of small diameter will be accommodated in corresponding mutually opposite recesses 8 (as shown in FIG. 4, in the clamp 3 on the left).

Containers B of large diameter, on the other hand, will be retained between a portion of the tab 11 and the surface 9, which defines the recess 8, of a jaw 4 and those of the jaw 5 arranged opposite (as shown in FIG. 4, in the clamp 3 on the right).

It is therefore clear that the assembly 1 according to the disclosure is particularly versatile since it can be used indifferently for the supply, handling, and delivery of containers A of small dimensions and also of containers B of large dimensions.

The assembly 1 therefore also has a considerable versatility of use with respect to conventional similar devices which, by providing receptacles for accommodating the containers, are adapted to work only on containers of similar dimensions and shape.

It should further be noted that each clamp 3 can profitably comprise a driving jaw 4, which is functionally associated with a respective movement unit (not visible in the accompanying figures), and a driven jaw 5.

Respective complementary sets of teeth 12 for the mutual transmission of motion are defined on the surfaces facing toward and proximate to the driving jaw 4 and the driven jaw 5.

The innovative characteristics of the present disclosure also extend to a washing machine for containers A, B that comprises an external feeding station provided with a delivery region, an internal washing station, and an external output station.

The machine according to the disclosure will advantageously comprise an assembly 1 for feeding/picking up containers A, B which is provided with at least one support 2 which is provided with a plurality of grip clamps 3.

The support can be moved, by the action of respective actuators, between at least one first configuration of alignment with a respective external station and at least one second configuration of alignment with the internal washing station.

Each clamp 3 of the support 2 is constituted by a pair of mutually opposite jaws 4, 5, the internal faces of which are substantially concave and contoured.

According to the disclosure, the washing station can conveniently comprise a plurality of nozzles for dispensing the cleaning liquid.

A part of these nozzles can be at least partially insertable into a respective container A, B, which is accommodated in a respective clamp 3 of the support 2, and is movable integrally with the support 2 along the washing station.

It should be noted that the nozzles that are to be at least partially inserted into a respective container A, B can also be moved along a direction toward/away from the respective container A, B.

It should be noted that the arrangement of the nozzles that are to be accommodated in respective containers is such that when a clamp 3 is holding a container A of small diameter, the nozzle is perfectly aligned with the longitudinal axis of such container A, and therefore is able to enter inside it without touching it or interfering with it.

If the clamp 3 is holding a container B of large diameter, then a slight offset will be detectable between the longitudinal axis of the container B and the axis of the nozzle: such offset does not however cause any problem in the step of inserting the nozzle into the container B, with regard to the large diameter thereof.

In order to also enable the drying of the containers A, B, the washing station can advantageously comprise hot air diffusers in its end sections (the ones proximate to the output station).

Finally, it should be noted that the actuators adapted to move the support 2 comprise an apparatus for the linear translation of that support 2, which will be integral with a common frame of the stations (for supply, washing and exit). The linear translation that occurs along the frame by way of the action of the aforementioned apparatus will be from the external feeding station to the external output station, passing through the internal washing station.

The actuators of the support 2 will further comprise at least one element for linear movement along a direction that is substantially transverse with respect to the direction defined by the apparatus.

The movement element will also be integral with the frame, and will be designed to vary the height of the support 2 as a function of the height of the area for the delivery of the containers A, B of the external feeding station, of the washing area of the internal washing station, and of the delivery area of the external output station.

Advantageously the present disclosure solves the above mentioned problems, by providing an assembly 1 for feeding/picking up containers A, B for washing machines that ensures a high hourly rate of containers A, B subjected to washing, while preventing contact between them during the washing proper.

By virtue of the support 2, in fact, it is possible to hold numerous containers A, B simultaneously and therefore subject them simultaneously to washing.

It should further be noted that having a sequence of aligned supports 2 makes it possible to carry out the washing operations rapidly, on a high number of containers A, B simultaneously.

Conveniently the assembly 1 according to the disclosure is particularly versatile and can be used with containers A, B of various shapes and various dimensions. In fact the clamps 3 are particularly versatile since they make it possible to clamp any type of container A, B (with particular reference to containers A, B of the pharmaceutical sector, such as for example phials, syringes, carpules, jars and the like).

Positively the washing machine according to the disclosure will be provided with the assembly 1 and therefore it will be versatile and adapted to the washing of containers A, B of different shapes and different dimensions.

Positively the machine according to the disclosure can ensure a high hourly rate of containers A, B subjected to washing, in relation to the ability of the support to hold a plurality of containers A, B at a time.

Advantageously the assembly 1 for feeding/picking up containers for washing machines and the washing machine provided with such assembly are easily and practically implemented and therefore substantially low cost: such characteristics make them an innovation that is certain to be of practical application.

Conveniently, depending on whether the clamps 3 are mounted, with respect to the respective advancement direction in the assembly 1, forward or backward, the clamps 3 proper can deliver, or pick up, the containers A and B directly to/from a conveyance system of the screw feeder type (where the containers A and B are kept separate). In this manner it is possible to constantly maintain the separation of the containers A and B (thus preventing collisions and/or abrasions), with a considerable increase in quality of the type of treatment carried out with respect to conventional devices.

Such embodiment can likewise have one or more robots at its entry or exit points, which, respectively, deliver, or pick up, the containers A and B to/from the clamps 3.

The disclosure, thus conceived, is susceptible of numerous modifications and variations, all of which are within the scope of the appended claims. Moreover, all the details may be substituted by other, technically equivalent elements.

In particular the possibility exists of providing a mode of opening the clamps 3 which is managed by a single command (which therefore makes it possible to simultaneously open the clamps 3 and simultaneously close them again by virtue of the respective elastic elements 6 interposed between the jaws 4, 5 (which exert a forcing into mutual abutment of the internal faces of those jaws 4, 5).

Figure 5:
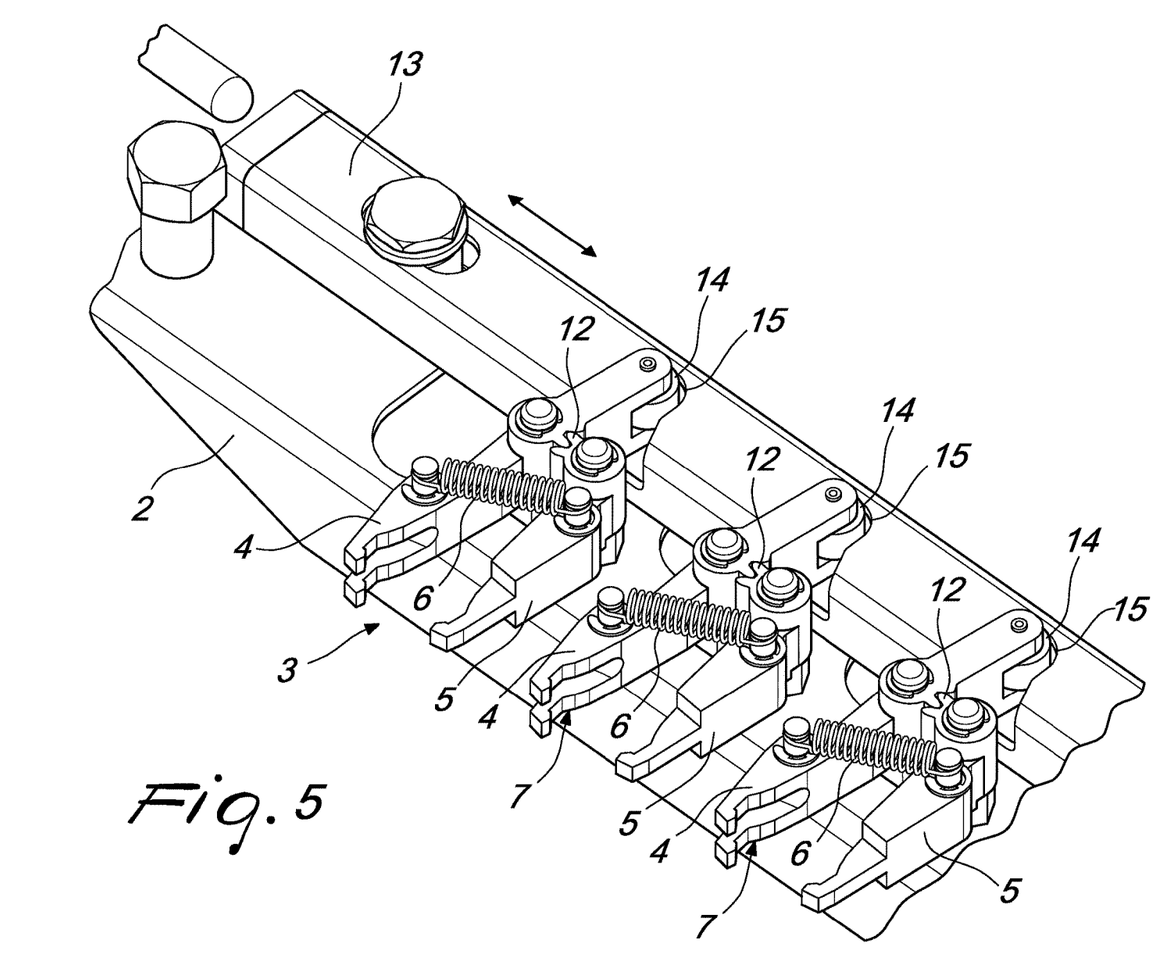
FIG. 5 is a perspective view of another possible assembly for feeding/picking up containers for washing machines according to the disclosure.
Figure 6:
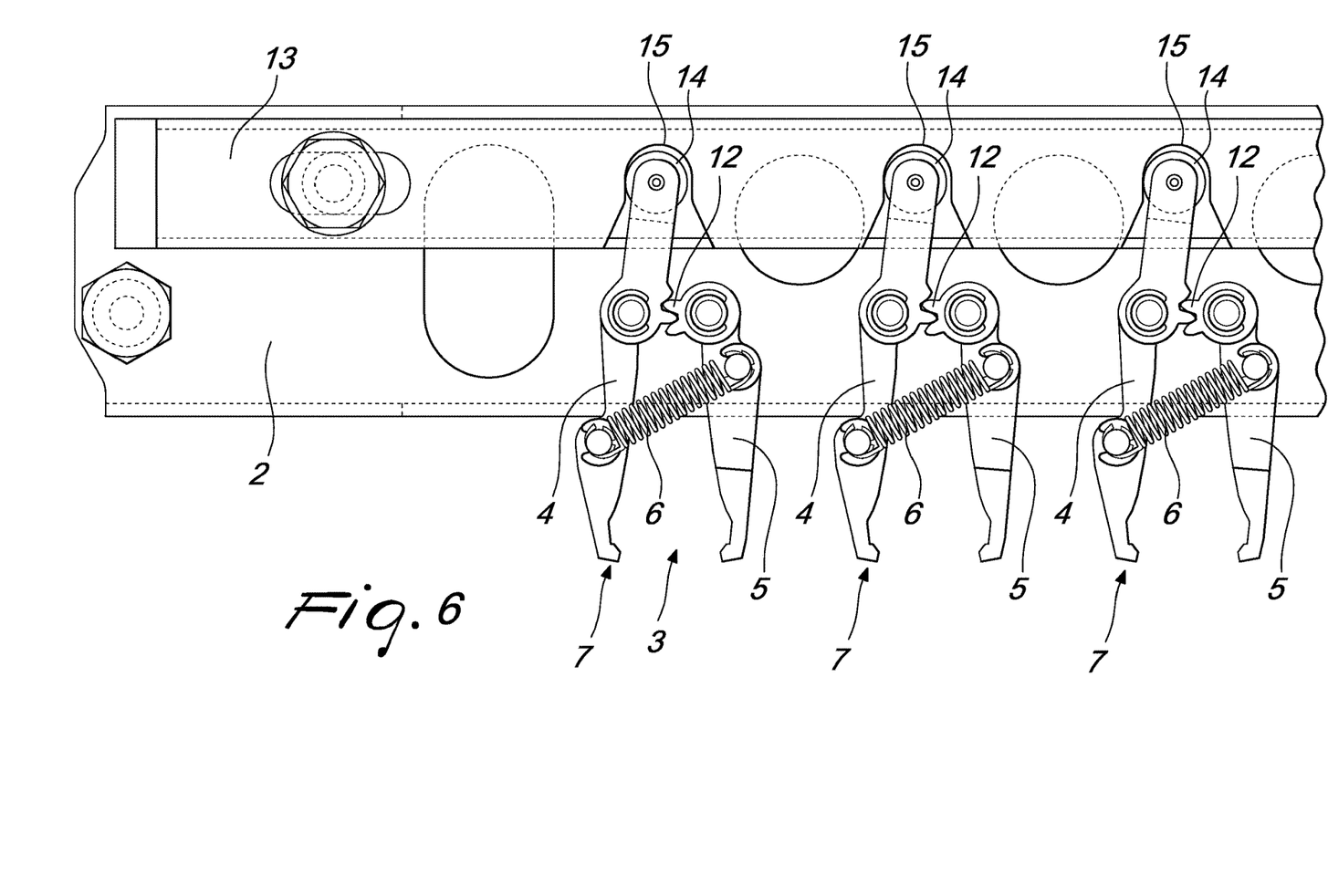
FIG. 6 is a view from above of the assembly of FIG. 5.

Such possible embodiment is illustrated by way of example in the accompanying FIGS. 5 and 6.

The application of a force on the translatable bar 13 which causes its translation implies the movement of all the jaws 4 (rotation with respect to the pivoting point thereof) with respect to the corresponding jaws 5, with consequent opening of all the clamps 3. The cessation of the force applied to the translatable bar 13 will cause the elastic return of all the clamps 3 to the closed configuration, by virtue of the presence of the individual elastic elements 6 arranged between each pair of jaws 4 and 5.

This embodiment ensures that, with a single translatable bar 13 adapted to open the clamps 3, all the clamps 3 are clamped on a respective container A and B, even though there are dimensional differences in diameter between the containers A and B being processed. This is achieved by virtue of the fact that between the idle roller 14 and the slot 15 of the translatable bar 13 there is play (variable between one-tenth of a millimeter and a few millimeters, depending on the specific application) which ensures that all the clamps 3 assume a gripping configuration on the respective container A and B that corresponds to the dimensions of that container A and B and does not correspond to the configuration assumed by the clamp 3 that is holding the wider container A and B (as would happen if there were no play between the idle roller 14 and the slot 15).

The consequence is that the remaining clamps 3 adapt their opening (and therefore their ability to support a respective container A and B) to the actual shape and dimensions of the respective container A and B.

Figure 1:
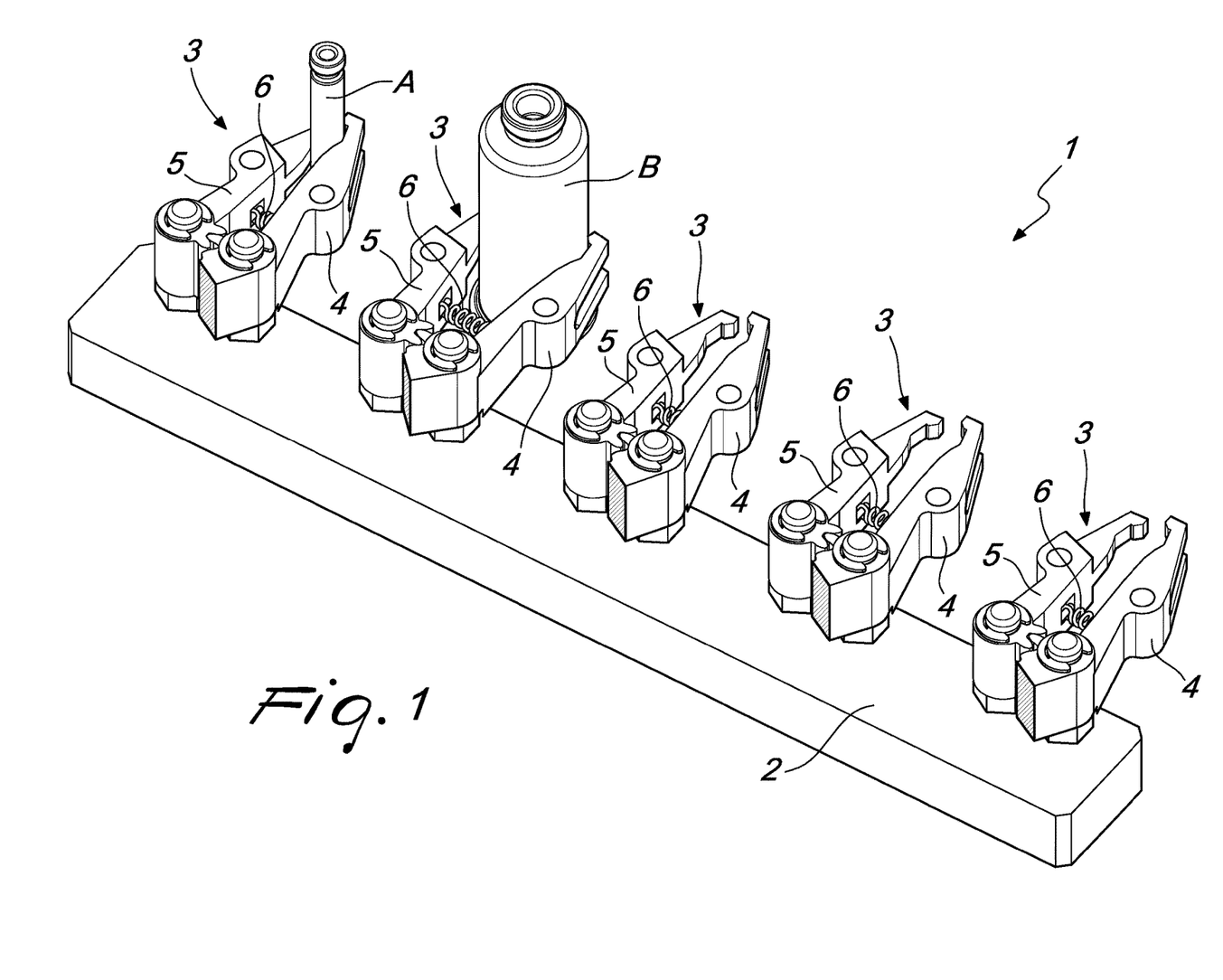
FIG. 1 is a perspective view of an assembly for feeding/picking up containers for washing machines according to the disclosure, in a configuration of holding two different containers.
Figure 2:
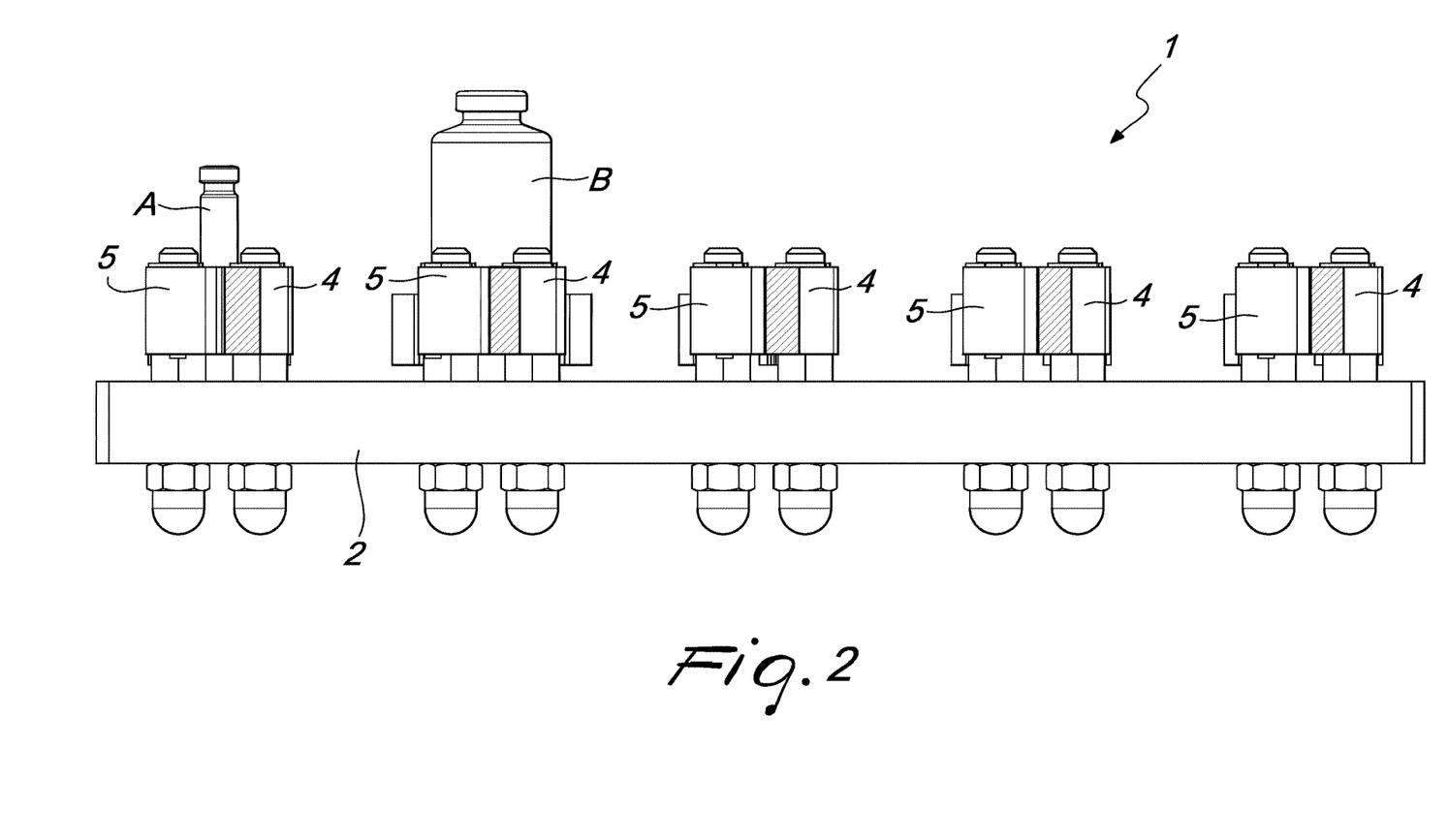
FIG. 2 is a front elevation view of the assembly of FIG. 1.
Figure 3:
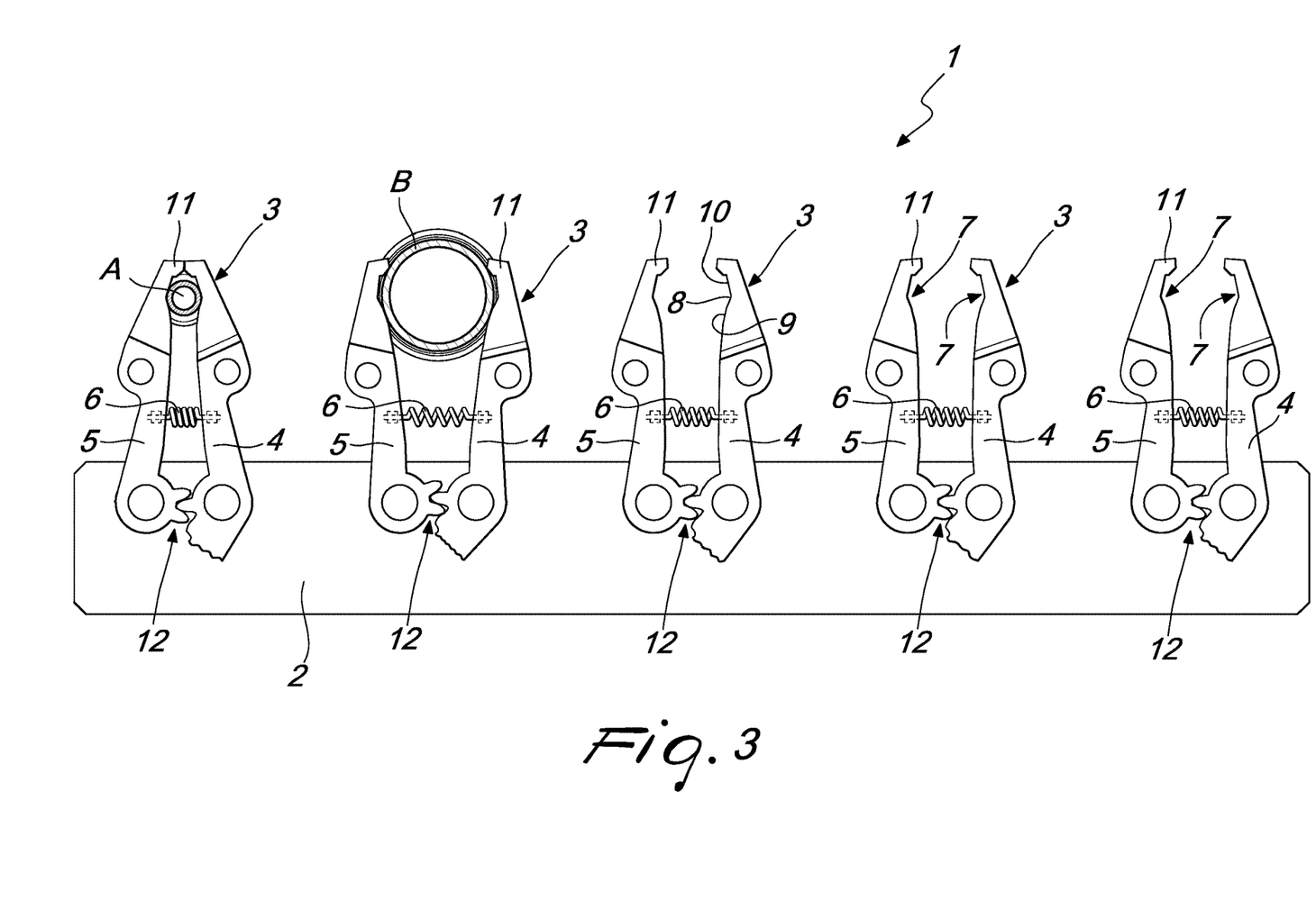
FIG. 3 is a view from above of the assembly of FIG. 1.

As is clearly visible in FIGS. 1 and 5, the jaws 4 and 5 are not identical to each other.

The jaws 4, in the example in the accompanying figures, comprise two protruding tines between which is defined a central cavity; the jaws 5, on the other hand, have a single tine that is substantially aligned with the central cavity of the corresponding jaw 4. This means that, upon the closing of the clamp 3, the jaws 4 and the jaws 5 bring the respective tines together until they reach a configuration of mutual interference in which the tine of the jaw 5 is at least partially accommodated in the central cavity of the jaw 4.

This particular shape structure enables the clamp 3 to grip and stably retain even containers A of small dimensions (small diameter).

It should be noted that dimensional variations possible between containers A (or B) of the same type are small but inevitable: the fact that the closing of the clamps 3 is carried out by virtue of the elastic elements 6 enables each clamp 3 to be clamped on the respective container A (or B) so as to hold it elastically in a safe and effective manner.

In the exemplary embodiments illustrated, individual characteristics shown in relation to specific examples may in reality be interchanged with other, different characteristics, existing in other exemplary embodiments.

In practice, the materials employed, as well as the dimensions, may be any according to requirements and to the state of the art.

The disclosures in Italian Patent Application No. 102016000027869 (UB2016A001750) from which this application claims priority are incorporated herein by reference.

The invention claimed is:

1. An assembly for feeding/picking up containers for washing machines, the assembly comprising:
   a support which can move by the action of respective actuators between at least one first position and at least one second position different from the first position,
   a plurality of grip clamps mounted on said support and disposed in a row, each grip clamp comprising a pair of opposite jaws pivotally mounted in order to rotate between a closing position and an opening position,
   an elastic element cooperating with each pair of opposite jaws in order to force the opposite jaws into mutual abutment,
   wherein each pair of opposite jaws consists of a driving jaw and a driven jaw, each driving jaw being coupled to a common bar, the translation of said common bar with respect to said support generating the rotation on a respective pivoting point of each driving jaw of said plurality of grip clamps against the force of the elastic elements and spacing apart the jaws of each pair of opposite jaws, with consequent simultaneous opening of all the grip clamps, the elastic element of each grip clamp elastically forcing the respective opposite jaws towards each other autonomously and independently from the other grip clamps, and
   wherein for each pair of opposite jaws the driving jaw comprises a tooth which cooperates with a respective tooth on the driven jaw to transmit the rotation caused by the common bar to the driven jaw.

2. The assembly according to claim 1, wherein each jaw of each grip clamp has a recess disposed between concurrent planes, and at least one protruding end tab, so that containers of smaller diameter can be accommodated within the recesses, and containers of larger diameter can be retained between a portion of said tab and one of the concurrent planes of said recesses of the jaws of said grip clamp.

3. The assembly according to claim 1, wherein the driven jaw has a pair of teeth wherein the tooth of the driving jaw is inserted therebetween.

4. The assembly according to claim 1, wherein the driving jaw and the driven jaw of each grip clamp are rotationally mounted about a respective rotational axis arranged on said support.

5. The assembly according to claim 1, wherein a roller is rotatably mounted on each driving jaw, said roller being accommodated within a slot on said common bar.

6. The assembly according to claim 5, wherein each slot has a space which is larger than the roller which is accommodated so that the roller can move within the slot.

* * * * *